(12) United States Patent
Zhang et al.

(10) Patent No.: US 11,830,530 B1
(45) Date of Patent: Nov. 28, 2023

(54) SKEW-INDEPENDENT CLOSE-POINT TRANSDUCERS

(71) Applicant: Seagate Technology LLC, Fremont, CA (US)

(72) Inventors: Lihong Zhang, Singapore (SG); Xiong Liu, Singapore (SG); Yanming Tan, New Brighton, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/573,313

(22) Filed: Jan. 11, 2022

(51) Int. Cl.
*G11B 5/60* (2006.01)

(52) U.S. Cl.
CPC ................ *G11B 5/6082* (2013.01)

(58) Field of Classification Search
None
See application file for complete search history.

(56) References Cited

U.S. PATENT DOCUMENTS

| | | | |
|---|---|---|---|
| 6,466,408 B2 | 10/2002 | Baumgart et al. | |
| 7,542,246 B1 | 6/2009 | Song et al. | |
| 7,573,682 B2 | 8/2009 | Pust et al. | |
| 7,593,189 B2 | 9/2009 | Thurn | |
| 7,646,566 B1 | 1/2010 | Crimi et al. | |
| 7,660,080 B1 | 2/2010 | Liu et al. | |
| 7,701,676 B2 * | 4/2010 | Kubotera | G11B 5/6064 360/125.31 |
| 7,948,713 B2 | 5/2011 | Ohta et al. | |
| 7,957,104 B2 | 6/2011 | Fu et al. | |
| 8,004,794 B2 | 8/2011 | Zhou et al. | |
| 8,325,570 B1 * | 12/2012 | Tanaka | G11B 5/314 360/125.31 |
| 8,432,636 B2 | 4/2013 | Brand | |
| 8,711,520 B2 * | 4/2014 | Koike | G11B 5/6005 360/294.7 |
| 8,724,263 B2 * | 5/2014 | Hutchinson | G11B 5/6005 360/125.74 |
| 8,730,616 B2 | 5/2014 | Yamada et al. | |
| 8,767,339 B2 | 7/2014 | Zeng et al. | |
| 8,881,376 B2 | 11/2014 | Zhou et al. | |

(Continued)

OTHER PUBLICATIONS

Hsiao, R; "Fabrication of magnetic recording heads and dry etching of head materials", IBM Journal of Research and Development, vol. 43, Issue 1-2, Jan. 1999, pp. 89-102, URL: https://doi.org/10.1147/rd.431.0089.

(Continued)

*Primary Examiner* — Brian E Miller
(74) *Attorney, Agent, or Firm* — Kagan Binder, PLLC

(57) ABSTRACT

A slider for use in a disk drive includes a substrate surface to be spaced from recording media surface within the disk drive, at least one read/write transducer having a transducer end surface adjacent and proximate to the substrate surface, a protrusion controller associated with the at least one read/write transducer. The transducer end surface includes a preformed protrusion extending generally in a direction perpendicular to the substrate surface, the protrusion is substantially centered along the transducer end surface, and the protrusion formed to passively provide a consistently-positioned close-point to the recording media surface when the protrusion controller is active.

19 Claims, 10 Drawing Sheets

(56) References Cited

U.S. PATENT DOCUMENTS

| | | | |
|---|---|---|---|
| 8,937,785 B1* | 1/2015 | Kojima | G11B 5/607 360/75 |
| 9,001,452 B2 | 4/2015 | Daugela et al. | |
| 9,087,530 B2 | 7/2015 | Pust et al. | |
| 9,111,551 B2 | 8/2015 | Seigler et al. | |
| 9,153,265 B1 | 10/2015 | Liu et al. | |
| 9,165,584 B2 | 10/2015 | Sytine et al. | |
| 9,202,490 B2 | 12/2015 | Zuckerman et al. | |
| 9,449,629 B2 | 9/2016 | Anaya-Dufresne et al. | |
| 9,472,225 B2* | 10/2016 | Lou | G11B 5/607 |
| 9,536,554 B2 | 1/2017 | Zuckerman et al. | |
| 9,685,182 B1 | 6/2017 | Granz et al. | |
| 9,842,614 B2 | 12/2017 | Hutchinson et al. | |
| 10,204,645 B2 | 2/2019 | Hutchinson et al. | |
| 10,319,400 B1 | 6/2019 | Wei et al. | |
| 10,360,935 B1* | 7/2019 | Liu | G11B 5/3166 |
| 10,593,355 B1 | 3/2020 | Basu et al. | |
| 10,699,733 B1 | 6/2020 | Rivkin et al. | |
| 10,839,830 B1 | 11/2020 | Peng et al. | |
| 11,056,134 B1 | 7/2021 | Eppler | |
| 11,238,891 B1* | 2/2022 | Zuckerman | G11B 5/607 |
| 2003/0184915 A1* | 10/2003 | Kameyama | G11B 5/6005 360/235.8 |
| 2005/0005426 A1* | 1/2005 | Ohno | G11B 5/3906 29/603.12 |
| 2005/0024957 A1* | 2/2005 | Gider | G11B 5/3109 |
| 2006/0285248 A1* | 12/2006 | Pust | G11B 5/3133 360/125.74 |
| 2007/0230050 A1* | 10/2007 | Ruiz | G11B 5/6005 360/236.2 |
| 2008/0043372 A1 | 2/2008 | Shimozato | |
| 2008/0094755 A1* | 4/2008 | Ota | G11B 5/3967 |
| 2008/0117549 A1* | 5/2008 | Huang | G11B 5/6005 360/234.3 |
| 2008/0198510 A1 | 8/2008 | Sugimoto et al. | |
| 2008/0259502 A1* | 10/2008 | Shimizu | G11B 5/6082 360/235.8 |
| 2009/0168248 A1* | 7/2009 | Matsumoto | G11B 5/54 360/235.7 |
| 2009/0268335 A1* | 10/2009 | Huang | G11B 5/607 360/75 |
| 2010/0118442 A1* | 5/2010 | Kuroki | G11B 5/6064 360/234.3 |
| 2010/0134915 A1* | 6/2010 | Sasaki | B24B 37/042 360/59 |
| 2010/0142092 A1* | 6/2010 | Bolasna | G11B 5/6029 |
| 2010/0142094 A1* | 6/2010 | Fujimaki | G11B 5/6005 |
| 2010/0157479 A1* | 6/2010 | Abiko | G11B 5/6005 360/234.3 |
| 2011/0069408 A1* | 3/2011 | Kurita | G11B 5/40 360/59 |
| 2011/0149430 A1* | 6/2011 | Shiramatsu | G11B 5/6064 360/75 |
| 2011/0299188 A1* | 12/2011 | Ono | G11B 5/607 360/59 |
| 2012/0008231 A1* | 1/2012 | Tsuchiyama | G11B 5/3116 360/59 |
| 2012/0099218 A1* | 4/2012 | Kurita | G11B 5/607 360/59 |
| 2012/0218662 A1* | 8/2012 | Sasaki | G11B 5/607 |
| 2013/0308223 A1* | 11/2013 | Ruiz | G11B 5/607 |
| 2015/0332717 A1* | 11/2015 | Hara | G11B 5/3106 29/603.07 |
| 2019/0189153 A1* | 6/2019 | Hu | G11B 21/21 |
| 2020/0111506 A1* | 4/2020 | Andruet | G11B 5/607 |

OTHER PUBLICATIONS

Baggaglin et al, "Innovative Low Temperature Plasma Approach for Deposition of Alumina Films", Materials Research, 2014; 17(6): pp. 1410-1419, 11 pages, Nov. 2014.

* cited by examiner

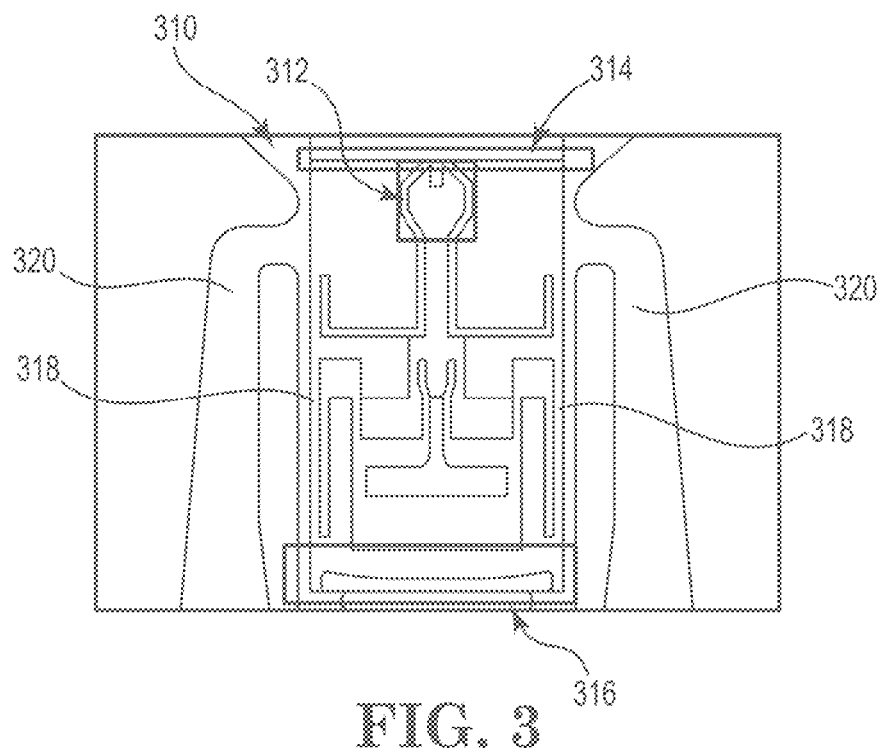
FIG. 3
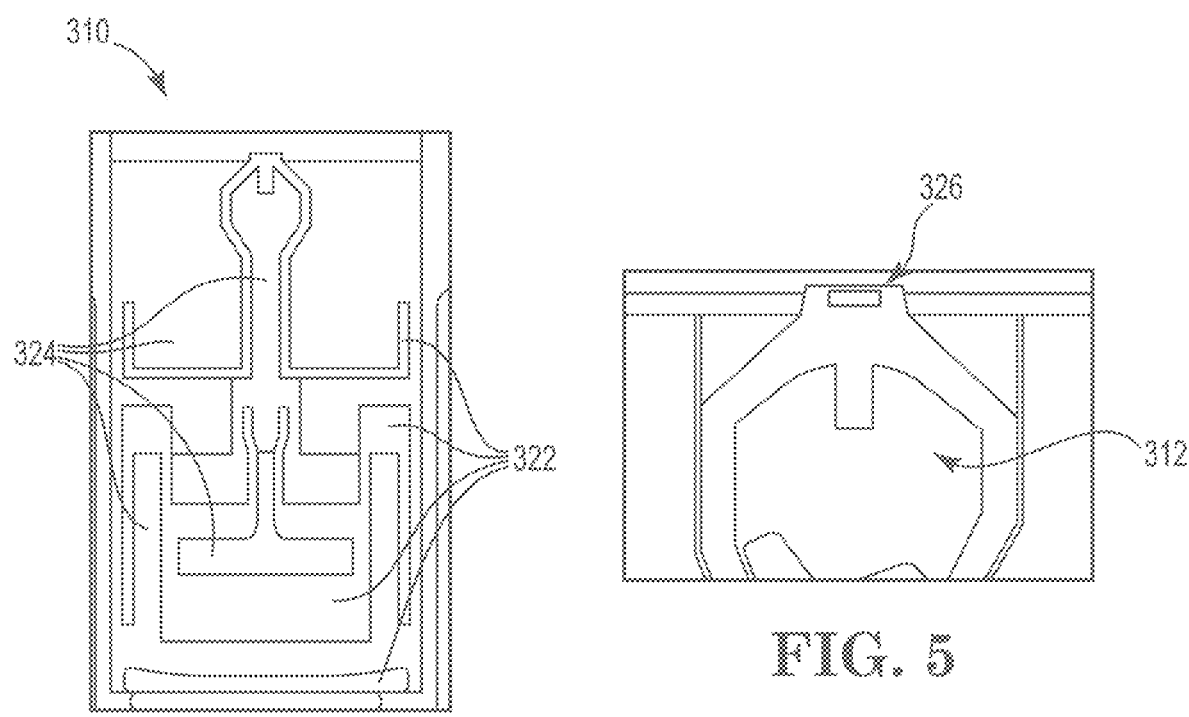
FIG. 4
FIG. 5

SKEW-INDEPENDENT CLOSE-POINT TRANSDUCERS

BACKGROUND

The present disclosure relates to aspects of heads movably supported within a disk drive, and in particular to magnetic recording heads that include one or more read transducer and one or more write transducer located in a transducer area of the head.

In a magnetic data storage and retrieval system, a magnetic head (a.k.a., a "read-write head," "magnetic recording head," "transducers," or the like) typically includes a writer portion, which includes a writer for storing (writing) magnetically-encoded information onto a magnetic recording medium, and a reader portion, which includes a reader for retrieving (reading) the magnetically-encoded information from the magnetic recording medium. To write data, an electrical current is caused to flow through a conductive coil to induce a magnetic field in the writer. By reversing the direction of the current through the coil, the polarity of the data written to the magnetic media is also reversed.

The magnetic head is part of a larger structure, referred to as a slider, which includes a surface (referred to as an "air-bearing surface," [ABS]) that opposes a surface of the magnetic recording medium during operation of the magnetic data storage and retrieval system. The slider positions the magnetic recording head in close proximity to the magnetic recording medium (or media), via the ABS. The slider is suspended above the magnetic recording medium by a cushion of gas that is caused to flow between the ABS and the magnetic recording medium by rotation of the rotating magnetic recording medium. The distance between the magnetic head and a surface of the magnetic recording medium is preferably small enough to allow for writing to and reading from the magnetic recording medium with a large areal density, while large enough to prevent contact between the magnetic recording medium surface and the magnetic head. Performance of the magnetic head depends in large part on head-media spacing (HMS). High density recording preferably requires a small HMS and a low fly height (the height of the slider above the magnetic recording medium surface).

Many commercial magnetic head designs contain an additional system to that allows for more precise control of the distance between a reader or a writer, and a recording medium. These systems are used to selectively and controllably cause a reader or a writer to protrude a small distance away from the slider surface in a direction toward the magnetic recording medium, during an operation that is performed by the reader or the writer. This type of controlled movement of a reader or a writer is referred to as "protrusion," and may be produced by any useful protrusion controller and related structure of a slider, such as by a piezoelectric device, a heater (e.g., an electrothermal heater), or another type of protrusion controller that is effective to cause a desired protrusion of the reader or writer away from a surface of the magnetic head. The protrusion controller is effective to cause protrusion of a reader or a writer to selectively reduce a distance between the reader or the writer, during reading or writing, respectively.

As an example of system that causes a protrusion of a reader or a writer to form, a heater actuator heats a specific portion of a magnetic head at a location of the reader or the writer to cause a controlled amount of thermal expansion of the portion of the magnetic head. The controlled thermal expansion causes a portion of the magnetic head to expand in size in a manner that reduces the distance between a reader or the writer and the magnetic recording medium surface.

Hard-disk drives (HDDs) are examples of data storage devices that include one or more rotatable disks to which data is written and read by way of magnetic read/write transducer heads that are movably supported with respect to surfaces of the disks by a corresponding number of head suspension assemblies (HSAs) that each include a head actuator arm. Each HSA can comprise a flexure connecting a load beam to a slider. The HSAs and actuator arms can together form a head stack assembly. One HSA is typically movably supported relative to a respective disk surface so that a magnetic read/write head can be selectively positioned relative to a data track of the disk surface. Such magnetic head is typically provided on an aerodynamically-designed slider so as to fly closely to the disk surface, at a so-called "fly height," of several nanometers above the disk surface while the disk is spinning. Each HSA is typically connected to a rotatable drive actuator arm for moving a read/write head and slider including a flexure or gimbal over the disk surface for data writing and reading. Each actuator arm is connected to be driven by a voice coil drive actuator servomechanism device. Such an assembly allows each magnetic read/write head to be independently controlled for positioning relative to specific data tracks of a disk surface.

As data storage needs have increased, typical HDD data track density on disk surfaces has also steadily increased in order to obtain greater data storage within a given disk surface area. This disk surface density is commonly referred to as areal density. Specifically, the data tracks themselves have become narrower and the radial spacing between tracks has decreased in order to increase disk areal density. Increased HMS precision and close fly heights have led to a greater need to precision and reliable transducer area location relative to the data track(s) being read/written.

SUMMARY

Aspects of the invention described herein are directed to improving centering and reducing transducer-media close-point skew based on heating and/or cooling by preventatively providing a passive centering protrusion on the transducer area of or near the air-bearing surface (ABS) of the head.

This disclosure addresses challenges related to close-point deviation or "skew" of head-media close points in heated transducers for use in hard-drive heads. Performance is improved by reducing close-point deviation in heat-assisted hard-drive transducers by providing a protruding, passive feature extending from the transducer area surface. This protruding, passive structural feature is provided or formed prior to heating the transducer for adjusting head-media spacing. The protruding passive feature can be a bulge or extension at the transducer area surface with a highest (most protruded) central point that operates to reduce the effects of close-point skew when various parts of the transducer are heated/cooled to various degrees.

The practical effect of the inclusion of a disclosed passive protrusion allows for a head-media spacing close point that is more consistently and predictably centered on the transducer, which minimizes head-disk spacing regardless of head skew, especially in response to heating of the transducer. This results in less process variation based on close-point shift or skew. The close point shift or skew includes combined effects of aerodynamic aspects of system and process variations of the slider transducer area. Some shift or skew may still occur, but the proposed protrusion effectively reduces these affects, passively.

As described herein, the protrusion can be created, e.g., using pattern deposition, such as when depositing a trailing end cap layer, or by ion or plasma etching, such as after the trailing end cap is deposited, among other variations. These and various other features and advantages will be apparent from a reading of the following detailed description.

According to a first aspect of the present disclosure, a slider for use in a disk drive is disclosed. According to the first aspect, the slider includes a substrate surface to be spaced from recording media surface within the disk drive. The slider also includes at least one read/write transducer having a transducer end surface adjacent and proximate to the substrate surface. The slider also includes a protrusion controller associated with the at least one read/write transducer. Also according to the first aspect, the transducer end surface includes a preformed protrusion extending generally in a direction perpendicular to the substrate surface, the protrusion is substantially centered along the transducer end surface, and the protrusion formed to passively provide a consistently-positioned close-point to the recording media surface when the protrusion controller is active.

According to a second aspect of the present disclosure, a storage device is disclosed. According to the second aspect, the storage device includes a rotatable storage disk. The storage device also includes a rotatable drive actuator arm. The storage device also includes a slider including read/write head located on the rotatable drive actuator arm. The storage device also includes a controller. The storage device also includes a head suspension assembly. According to the second aspect, the slider includes a substrate surface to be spaced from a recording media surface within the storage device. The slider also includes at least one read/write transducer having a transducer end surface adjacent and proximate to the substrate surface. The slider also includes a protrusion controller associated with the at least one read/write transducer. Also according to the second aspect, the transducer end surface includes a preformed protrusion extending generally a direction perpendicular to the substrate surface, the protrusion is substantially centered along the transducer end surface, and the protrusion formed to passively provide a consistently-positioned close-point to the recording media surface when the protrusion controller is active.

According to a third aspect of the present disclosure, a method of making a slider for use in a disk drive is disclosed. According to the third aspect, the method includes receiving a substrate surface to be spaced from recording media surface within the disk drive. The method also includes depositing at least one read/write transducer in a stack in a down-track direction, the at least one read/write transducer having an associated transducer end surface adjacent and proximate to the substrate surface. The method also includes providing a protrusion controller associated with the at least one read/write transducer. The method also includes forming a protrusion in a cross-track direction and extending generally in a direction perpendicular to the substrate surface, where the protrusion is caused to be formed substantially centered along the transducer end surface, and the protrusion is formed to passively provide a consistently-positioned close-point to the recording media surface in the cross-track direction when the protrusion controller is active.

BRIEF DESCRIPTION OF THE DRAWINGS

The present invention will be further explained with reference to the appended Figures, wherein like structure is referred to by like numerals throughout the several views, and wherein:

FIG. 3 is a top view of a magnetic head, according to various embodiments.

FIG. 4 is another view of the magnetic head of FIG. 3, according to various embodiments.

FIG. 5 is a view of a center pad and transducer area of the magnetic head of FIG. 3, according to various embodiments.

DETAILED DESCRIPTION

Described herein are sliders that include magnetic heads (or "magnetic recording heads"), which include magnetic recording and reading features built into the head. The description also relates to data storage devices, such as hard-disk drives (HDDs), that include one or more slider and magnetic head of this description, and to methods of using the magnetic heads and HDDs to record, store, and read data. As described in greater detail below, a passive protrusion can be formed or otherwise provided on or proximate a transducer area (e.g., transducer pole area) of a magnetic head to improve close-point (CP) accuracy and performance, especially when used in a selectively expandable head, e.g., a heat-assisted magnetic head or piezoelectric head. Contemplated examples of heat-assisted magnetic heads and systems include heat-assisted magnetic recording (HAMR) technologies.

Figure 1A:
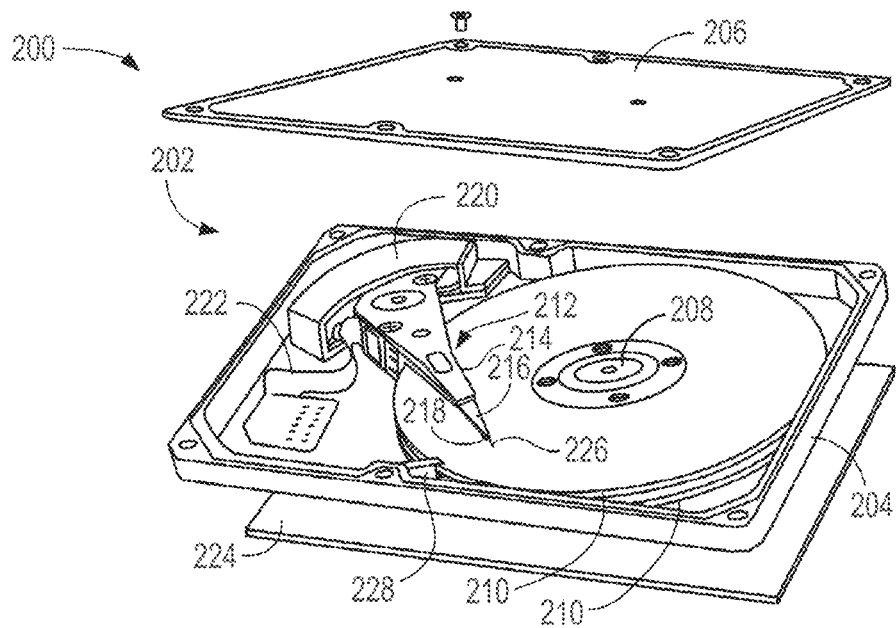
FIG. 1A and 1B illustrate example hard-disk drive components that may incorporate a magnetic recording head as described.
Figure 1B:
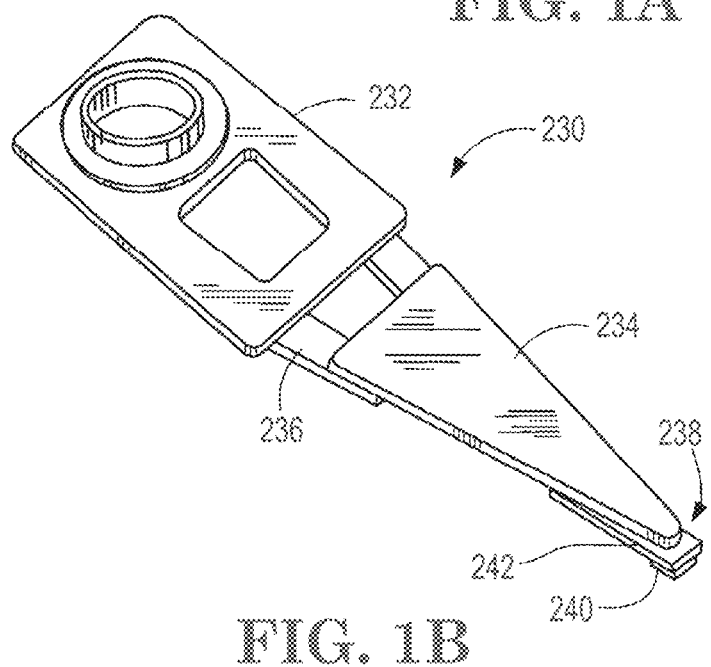

Examples of HDDs, can contain one or more magnetic recording head as described, and selected components of such HDDs are illustrated at FIGS. 1A and 1B. FIG. 1A is an exploded view of an exemplary data storage device 200. The device 200 includes a housing 202 formed from a base deck 204 and top cover 206.

Within the housing 202 of the device 200 is a spindle motor 208 that is configured to rotate a number of storage media (e.g., magnetic discs) 210 at a selected high rotational velocity. Also included within the housing 202 is an actuator assembly 212 that includes rigid actuator arms 214. The actuator arms 214 preferably support a corresponding array of head suspension assemblies (HSAs) 216. At the end of each HSA 216 is a flexure 218. Each flexure 218 supports a slider including a magnetic recording head, the slider having an air-bearing surface (ABS) and read/write transducer(s) (as described herein) facing a recording surface of the storage media (e.g., magnetic disk), to allow the slider to fly at a desired fly height above the associated storage media surface. One or more read and/or write transducing elements are included in the magnetic recording head of the slider.

A gaseous fluid atmosphere is retained within the housing 202, such as an air atmosphere or a low density, inert gas atmosphere. The gaseous fluid may be air or may be a low-density gas such as helium, which has a density that is substantially lower than that of air. The interior may also contain a mixture of helium with air or another gas. An HDD, an example of a storage device, can contain the gaseous fluid, which flows past the ABS of a magnetic recording head of the storage device during use, due to the movement of the magnetic recording medium surface (e.g., disk) as it moves past the ABS within the fluid environment. The spinning disk causes movement of the gaseous fluid at the disk surface, and the moving fluid impacts the ABS of the magnetic recording head to produce specific forces on various surfaces of the ABS. Desirably, the moving fluid impacts the ABS to cause a desired slider fly height and stability of the slider and corresponding magnetic head during use.

Actuator assembly 212 is rotated by voice coil motor (VCM) 220. Electrically conductive signal paths are formed on a flexible printed circuit cable (e.g., a flex circuit) 222, which couples the actuator arms 214 with a device printed circuit board (PCB) 224. The device PCB 224 is mounted to an external surface of the base deck 204 and supports communication and control circuitry used by the device 200 to interface with a host, such as a computer system comprising, e.g., a hardware processor and memory. In some embodiments, a ramp load tab 226 may project forward adjacent each flexure 218 and slider to allow the HSAs and sliders to be unloaded from the media surfaces onto a ramp structure 228 when the device 200 is inactive or deactivated.

FIG. 1B is an isometric view of an exemplary HSA 230 for use in a contemplated storage device (e.g., storage device 200). The HSA 230 can be similar and/or share features with HSA 216 described above. The HSA 230 includes a base 232 that supports a load beam 234 by way of a preload bend section 236. In some embodiments the load beam 234 is a single unit with the preload bend section 236 formed integrally as part of the load beam 234. The preload bend section 236 is typically formed at a desired radius to provide a predetermined bias that urges the slider toward the spinning media during use and against a lift force caused by the interaction of the spinning gaseous fluid with the ABS. The balance achieved by the spring bias and the lift force defines the fly height. A flexure 238 is supported at a distal end of the load beam 234 and includes a magnetic recording head on a slider 240 and a flexible element 242 (e.g., a portion of a flexure as described herein) that allows the slider to pitch and roll. Example flexure 238 can be similar and/or share features with flexure 218, described above. Load beams with integrated gimbals are also well known and can be used.

The magnetic head(s) of the respective slider(s) 240 include read and write features, including at least a write transducer, and/or a read transducer. Preferably, at least one read transducer and at least one write transducer are provided within slider 240. The read and write transducers are structures of the magnetic head that preferably each interact, independently, with the magnetic recording medium to read or write bits of data magnetically to and from the recording medium.

The slider 240 incorporates into its structure the ABS, which is an aerodynamic feature that is shaped to allow for precise control of the location (distance) of the magnetic head to be in very close proximity to a recording surface of a magnetic recording medium. Generally, an ABS during operation and when in proximity to a spinning recording medium (e.g., a disk) causes the lift force on the slider that is counterbalanced by the bias from the preload bend section 236. The ABS of the slider 240 also includes a transducer area proximate the read/write transducer(s). The resulting spacing between the magnetic head portion of the slider 240 and the recording medium is the slider fly height.

In addition to an ABS configured precise fly height control, the magnetic head of the slider 240 can also include one or more additional features to add further precision control of the distance between the read or write transducer and the magnetic recording medium surface. The magnetic head can further be independently provided with further precision control of the distance between the read and write transducer and the magnetic recording medium surface. These additional control features can be accomplished with a feature and/or system that selectively causes a surface portion of the magnetic recording head, which is associated with a read transducer or a write transducer, to change shape so as to protrude from the surface of the magnetic recording head, toward the magnetic recording medium surface, to reduce the spacing between the head portion transducer area and the surface. This type of control feature is referred to herein as a "protrusion controller," and may be of various known designs, such as a thermo-resistive design, a piezoelectric design, any other thermal or electrical, or other active or selectively controlled expansion of one or more slider 240 features. Examples of protrusion controllers that include a thermo-resistive heater embedded in a magnetic recording head, to selectively cause protrusion of a write transducer of a read transducer, are described at U.S. Pat. Nos. 7,573,682, 8,432,636, the entireties of each being incorporated herein by reference for all purposes.

Desirably, during operation, actuating a protrusion controller of one transducer (e.g., a read or write transducer) (the "actuated transducer") can result in a desired and precisely controlled degree of protrusion of that transducer, without simultaneously causing an undesired degree of protrusion of another transducer (e.g., the other of the read or write transducer) (the "non-actuated transducer"). Incidental protrusion of a non-actuated transducer reduces the spacing between the non-actuated transducer and a surface of an adjacent magnetic recording medium, resulting in an increased potential for contact between the non-actuated transducer and the surface of the magnetic recording medium. Although some degree of active protrusion control has been possible, even greater control and precision, especially of close-point centering, remains desirable.

A magnetic recording head of the slider 240 of the present description is a microelectronic component of the slider 240 that during use is positioned above the magnetic recording medium, at which position the magnetic recording head can write or read data onto or from the medium (e.g., disk). The recording head includes at least one transducer that can sense a magnetic field and convert the field into an electrical current (a "read transducer"), and at least one transducer that can transform electrical current into a magnetic field that can magnetically record data onto the medium (a "write transducer").

According to the present description, and as described in more detail below, a magnetic recording head can beneficially be provided with a passive protruding feature that is designed to reduce undesired transducer-recording medium close-point misalignment or skew resulting from a heating of a transducer area of a magnetic head of the slider 240, e.g., during actuation by heat of at least one transducer and/or aerodynamic cooling of the transducer area. For example, slider cooling can be affected by various aerodynamic characteristics of the ABS and the resulting air flow as it passes the transducer area. Increased consistency and predictability can provide improved HDD storage device control.

The fly height is affected by the design of the ABS on the disk-facing surface of the magnetic recording head. Fly height clearance may be as little as three nanometers or less than one nanometer under active conditions. A role of the ABS is to maintain a relatively constant fly height and stable orientation of the magnetic head as the head remains positioned above the moving surface of the spinning magnetic disk. If the magnetic head (or any other part of the slider 240) contacts the spinning surface of the magnetic medium, a catastrophic head crash may result. If the head and its transducers are positioned too far from the medium, reading and writing functionalities can be inhibited. Additionally, if the magnetic head gets too close to the medium surface, abrasion and wear may remove a protective coating of the head and cause long-term failure, for example due to corrosion of unprotected metals.

The slider 240 for use with recording head of the description preferably includes a leading end, a trailing end or edge, and a length wise dimension between the leading end and the trailing end, this dimension also being referred to as a "down-track" dimension. The slider 240 also has a width direction that is perpendicular to the down-track dimension, this dimension being referred to as a "cross-track" dimension. The recording head includes a bottom surface, which is a surface that faces a surface of a magnetic recording medium during use. The bottom surface of the slider preferably includes the ABS and a trailing edge surface among other features, any of which can optionally be considered part of the ABS or alternatively a bottom, media-facing surface. At the trailing edge surface of the slider 240, embedded within an insulative material of the magnetic recording head, are a read transducer and a write transducer at a transducer area, as well as other structures that are adapted to allow for operation of the read transducer and the write transducer, such as one or more heaters or other active protrusion controllers. A media-facing portion of the trailing edge, the trailing edge surface of the slider 240, can be referred to herein as a transducer area. More specifically, the transducer area and trailing edge surface can be controllably shaped, including partially expanding and contracting during operation of the heat-assisted (or other protrusion-controlled) magnetic head and associated processes. A magnetic recording head as contemplated herein may have one, two, or more read transducers and/or one, two, or more write transducers in various embodiments.

Figure 2:
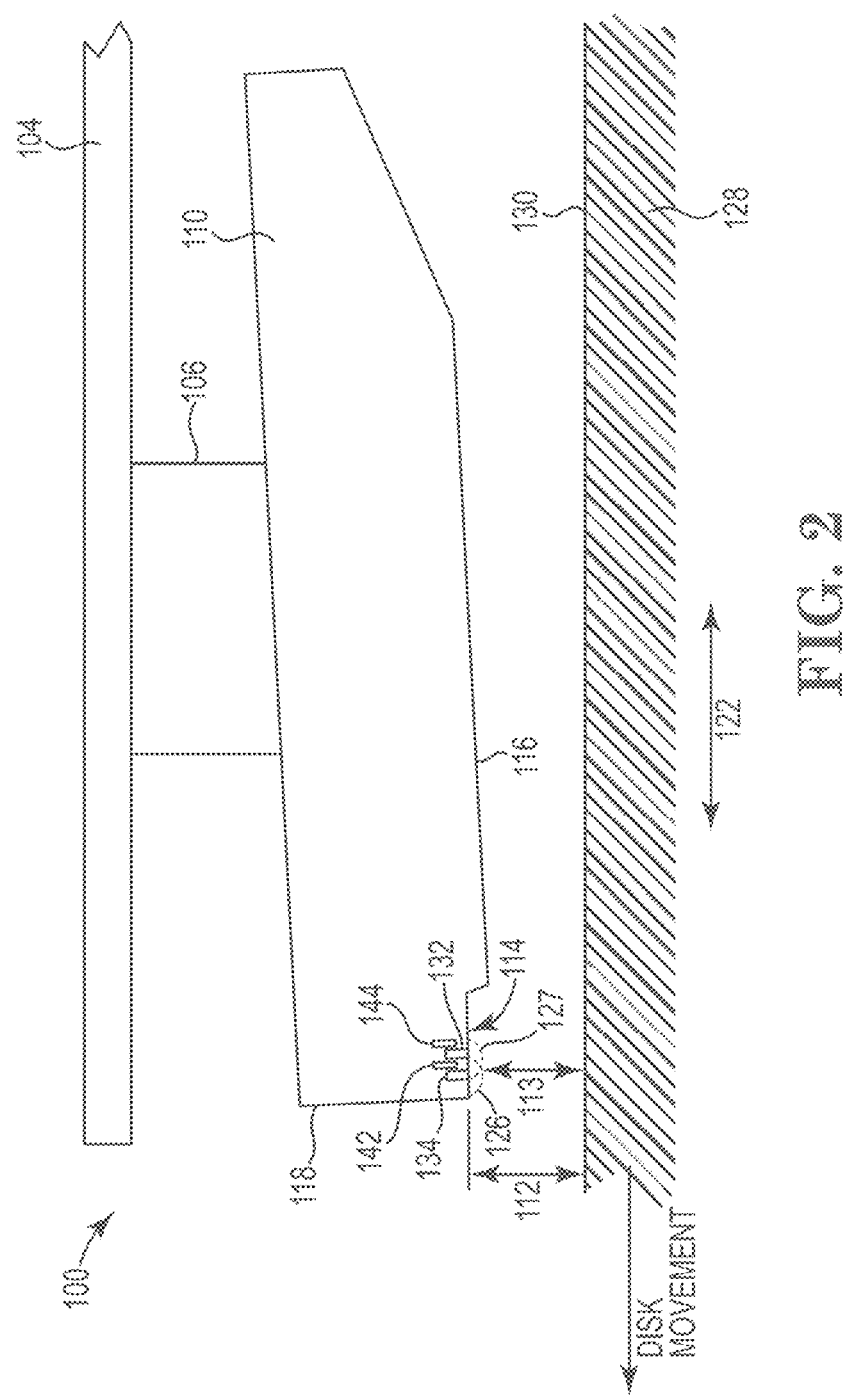
FIG. 2 is a side view of a slider and magnetic recording head as described relative to a magnetic recording medium.

Referring now to FIG. 2, a schematic block diagram shows a side view of a recording head arrangement 100 that includes example slider 110 (which can be similar or the same as slider 240, above) viewed in a cross-track direction relative to down-track direction 122. Slider 110 may be used in a magnetic data storage device, e.g., an HDD, and can include a magnetic head as described herein. Slider 110 is typically coupled to flexure 104 at a mounting plate 106 of the flexure, which may be done by any bonding technique. Slider 110 includes at least one reader (or "read transducer") 132 and at least one writer (or "write transducer") 134, each of which can be embedded in ceramic material at the trailing edge surface 114 and transducer area of the slider 110.

A magnetic read head of the present description can include both one or more read transducer 132 and one or more write transducer 134. FIG. 2 shows read transducer 132 and write transducer 134 at for example, an optionally similar location in down-track direction 122 of the slider. Although the write transducer 134 is shown further down-track from the read transducer 132, any other configuration or transducer arrangement is also contemplated. FIG. 2 also shows a first protrusion controller (e.g., a heater) 142 that is associated with read transducer 132, and a second protrusion controller (e.g., heater) 144 that is associated with write transducer 134.

During use, transducers 132 and 134 are held proximate to surface 130 of magnetic recording medium 128, e.g., a magnetic disk of an HDD. When slider 110 is located over surface 130 of recording medium 128, a fly height 112 is maintained between slider 110 and surface 130 in part by a downward force provided by the flexure 104. This downward force is counterbalanced by an upward force caused by the moving fluid described above, which exists between surface 130 and ABS 116 (also referred to herein as a "medium-facing surface") of slider 110 when recording medium 128 is rotating. It is desirable to maintain the slider fly height 112, preferably a predetermined distance, over a range of disk rotational speeds during both reading and writing operations to ensure consistent performance.

Region 126 is a more precise region of the trailing edge surface 114 that is associated with read transducer 134. Region 127 is a region of the trailing edge surface 114 that is associated with write transducer 132. Regions 126 and 127 can each, individually or collectively, and at times, be considered a "close point" (CP) of a transducer area of slider 110, which is generally understood to be a location of closest (minimum) spacing between a read transducer 132 or a write transducer 134 of slider 110, and surface 130 of recording medium 128, during use. A center of the CP can be more specifically referred to a "center point," although the terms can be used herein interchangeably. This minimum separation between a transducer and surface 130 occurs during operation and/or heating of the particular transducer, with protrusion of the transducer from surface 114 caused by actuating a protrusion controller. However, as described further below, CP "skew" can occur during transducer operation where the transducer is subject to one or more thermal effects, and the CP may not typically be precisely centered at the transducer area during varied operation, such as involving inconsistent or uneven heating and/or cooling.

Slider 110, as illustrated, includes protrusion controllers 142 and 144 (e.g., heaters) that can be actuated to cause controlled movement (protrusion) of the read transducer 132 and/or the read transducer 134 at 126/127, respectively, relative to surface 114, during use, to independently effect fine control of the spacing 113 between each transducer 132, 134 and surface 130 during operation. One example of a protrusion controller can be a thermo-resistive heater built into slider 110 at a location that is effective to produce controlled thermo-resistive heating and controlled thermal expansion of the material of slider 110 at 126/127 that is located adjacent to read transducer 132 or read transducer 134, at surface 114. Selective and controlled heating of the, e.g., ceramic material that is located adjacent to the read transducer or the write transduce can cause a local protrusion of the read transducer, the read head, or of the write transducer or a write head, due to thermal expansion of the material. The degree of protrusion can be finely controlled (e.g., by the protrusion controller(s)) to maintain a desired clearance 113 between the read transducer and the write transducer, and surface 130 of recording medium 128.

The portions of the magnetic recording head that are subject to controlled thermal expansion and protrusion typically include a region at surface 114 that is proximate the read transducer 134 at 126, and, independently, a region proximate the write transducer 134 at 127. Each of these regions, when thermally activated, becomes a region 126 or 127 that is a location of a protrusion of surface 114 of slider 110 in a direction of surface 130 of recording medium 128. To account for variations in slider fly height 112, slider 110 is configured such that protrusion of each region 126 and 127 can be independently controlled during operation to finely adjust spacing 113 between read head 132 and write head 134, although some skew can remain. An example of the heat-activated protrusion is shown in FIG. 2 by the dotted lines that represent a change in geometry of regions 126 and 127. In this example, the geometry change may be induced, in whole or in part, by an independent increase or decrease in temperature of the region 126 or 127 via the one or more protrusion controller 142, 144. However, to date, some imprecision and skew of the CP, e.g., due to heating and/or cooling of transducers during various transducer operation has limited areal density and fly height precision.

A passive, pre-formed protrusion on the transducer area of the magnetic head, as described herein in greater detail below, can improve CP precision and consistency, particularly for close and precise fly heights and high areal density applications.

With reference now to FIGS. 3-7, features of a media-facing surface (e.g., 114) of a magnetic head 310 and slider associated with a storage device are shown. The media-facing surface can also be referred to herein as a substrate surface, or slider substrate surface.

Figure 6:
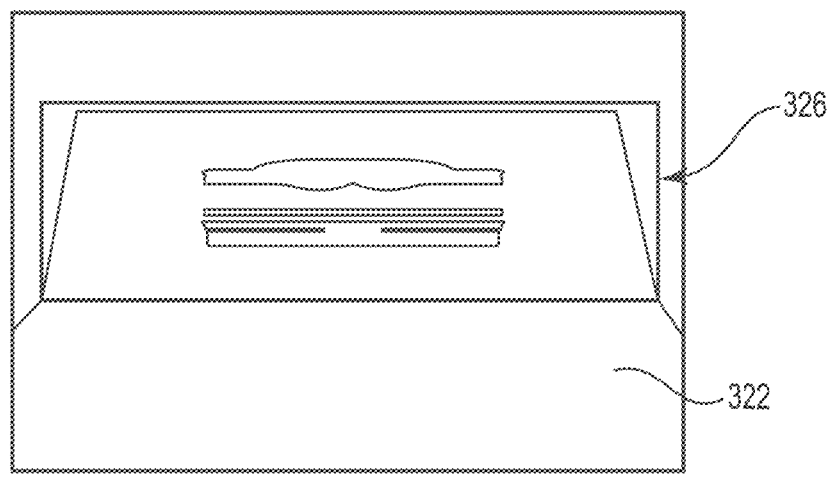
FIG. 6 is a closer view of the transducer area of the magnetic head of FIG. 3, according to various embodiments.

With reference to FIG. 3, a slider trailing edge (TE) 314, center pad 312, side rails 318, and suspension 320 of the magnetic head 310 media-facing surface are shown. As shown in FIG. 4, the magnetic head 310 media-facing surface includes various ABS features 322 and various cavities 324. In various embodiments, the ABS features 322 can include various diamond-like coatings (DLCs), as known in the art. With reference to FIG. 5, a center pad 312 and transducer area 326 are shown. FIG. 6 shows the transducer area 326 in greater detail and adjacent to the ABS 322.

Figure 7:
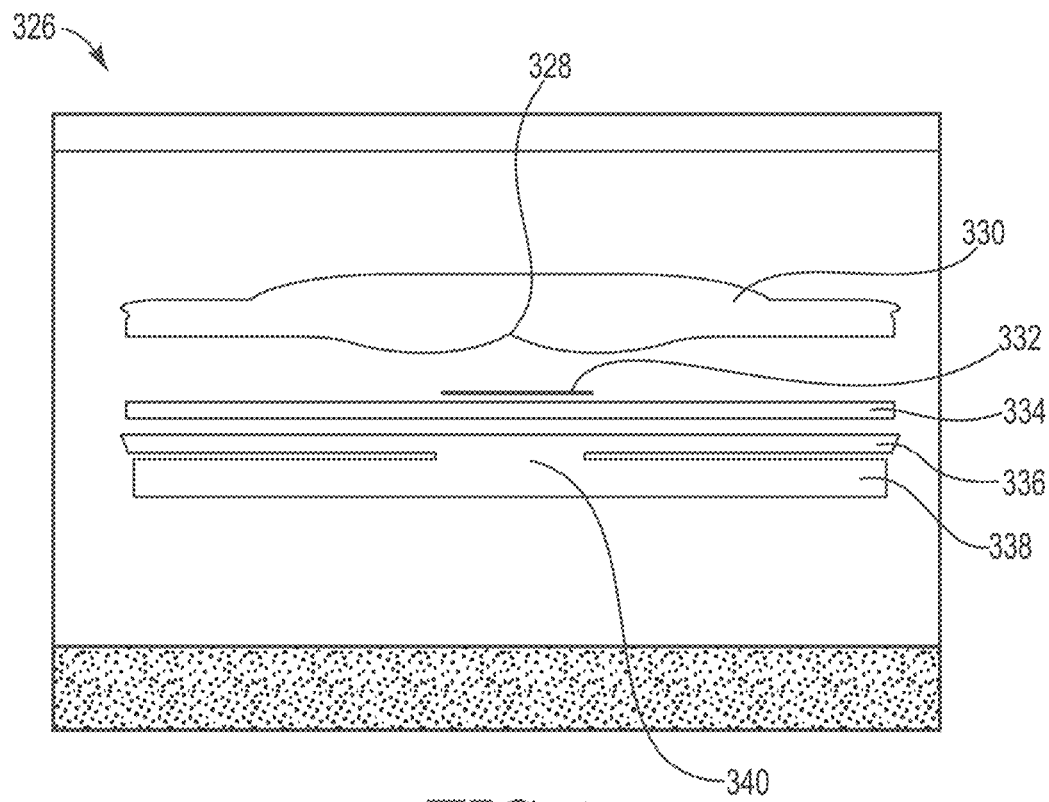
FIG. 7 is an even closer view of the transducer area of the magnetic head of FIG. 3, according to various embodiments.

Referring now to FIG. 7, a detailed view of the media-facing surface of the transducer area 326 is shown. As shown, from topmost to bottommost in a stack (corresponding to the down-track dimension 122 as shown in FIG. 2), a writer bottom return pole 330 adjacent a writer main pole 328. A thermal coefficient of resistance sensor (TCR sensor), such as a differential-ended thermal coefficient of resistance (DETCR) contact detection sensor 332 is also shown positioned adjacent the writer main pole 328 and a writer top return pole 334. Next, a bottom shield 336 is shown positioned adjacent a top shield 338, and a magnetic resonance (MR) reader 340 is positioned between the bottom and top shields 336/338. The various components shown in FIG. 7 can include various writers and readers as used herein.

Figure 8:
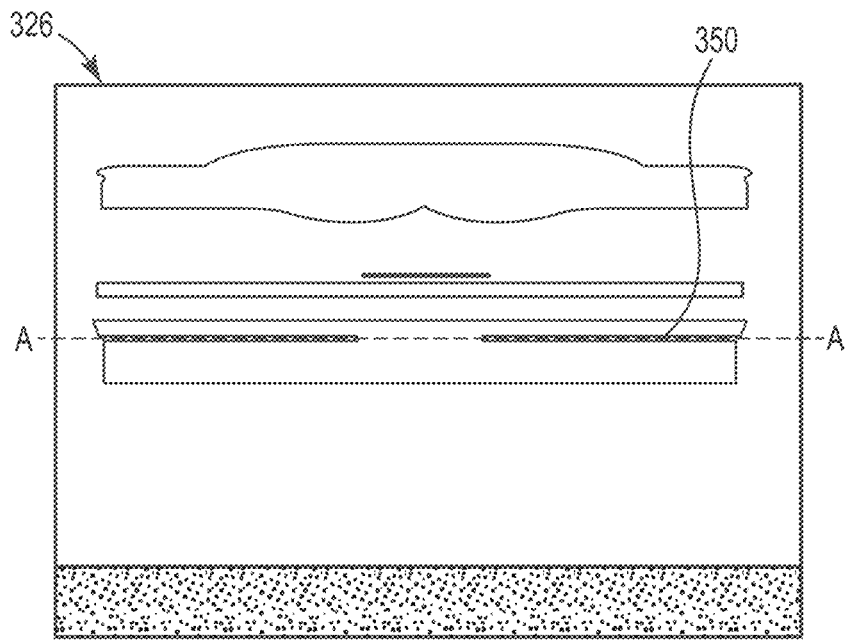
FIG. 8 shows a head transducer area profile cross-section location, according to various embodiments.
Figure 9:
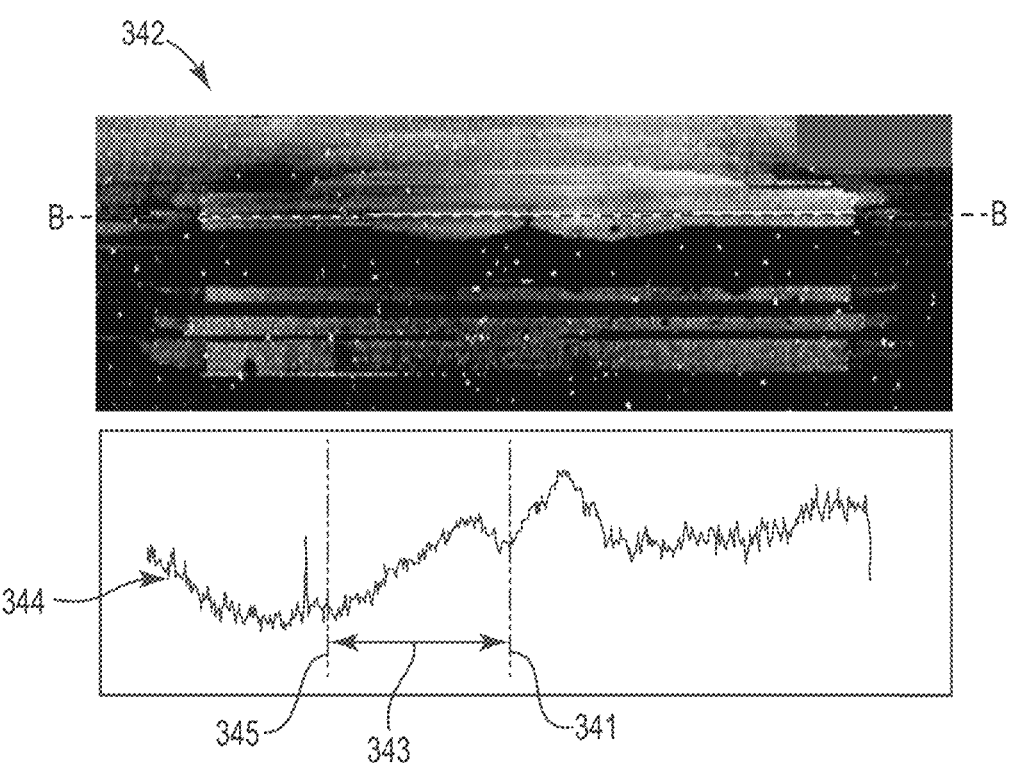
FIG. 9 shows an example cross-track topography of a slider transducer area, according to modeling data.
Figure 10:
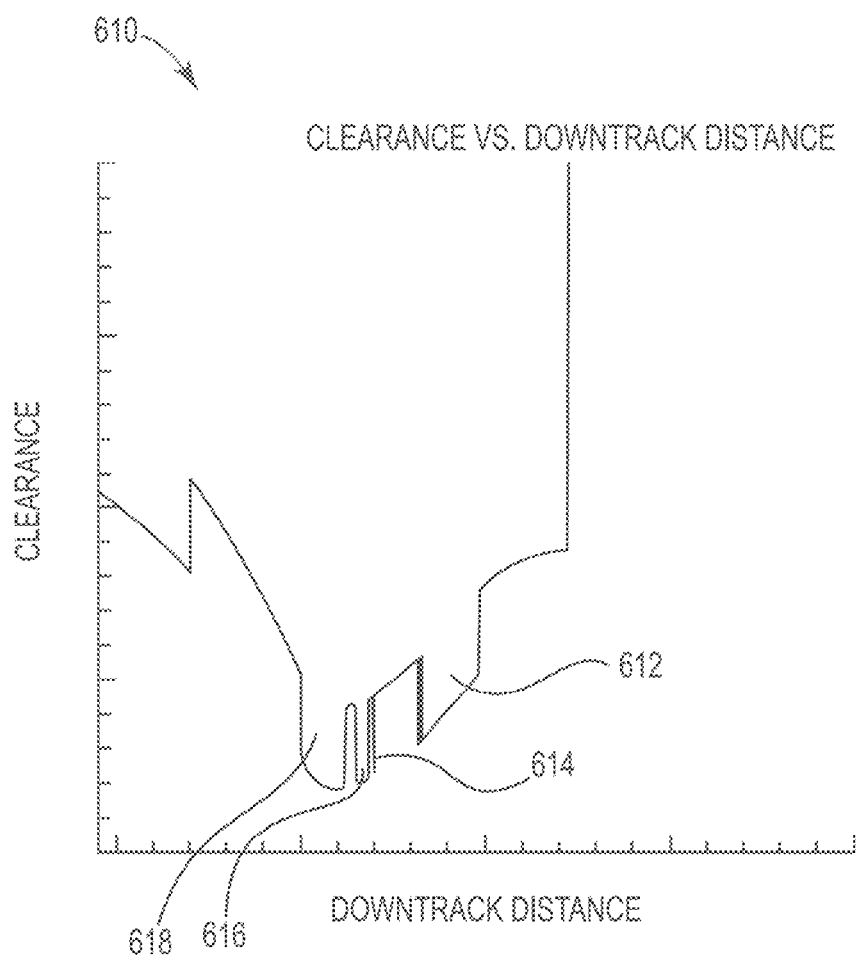
FIG. 10 is a graph showing clearance versus down-track distance at a magnetic head transducer area.
Figure 11:
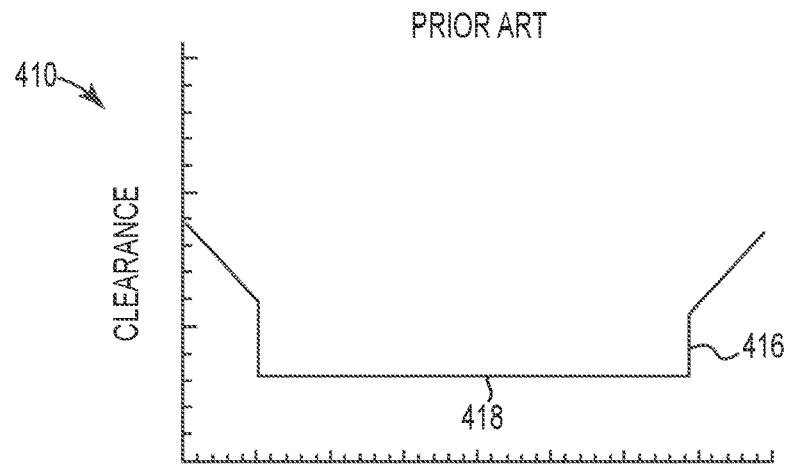
FIG. 11 shows a transducer area cross-track distance versus head-media clearance of an existing arrangement.

FIGS. 8-11 show certain transducer area aspects of a slider. According to FIG. 8, line A-A at 350 is a cross-track section corresponding to the profile diagrams of FIG. 11 is the cross-section height profile of the transducer area at passive condition for an existing design, which shows a flat transducer area height profile along the X-axis at a CP 418. Cross-track line A-A of FIG. 8 also represents the location of improved embodiments as described herein with respect to FIGS. 12-15. As the cross-track transducer area height profile 344 of FIG. 9 shows (taken at location as shown by line B-B), process variations in existing configurations (e.g., during heated operation) may shift or "skew" the close point (CP) in the cross-track direction from position 341 (ideal CP) to position 345 (observed CP). FIG. 9 shows a physical example of a slider transducer area measured by atomic force microscope (AFM) for height profiles. Shown at top is a 2-dimensional view of the transducer area, and the shown below is a cross-track (or cross-session) profile of the dashed line B-B. As shown, the CP is therefore shifted to the left along X-axis (cross-track direction) by a skew distance 343 away from the ideal center of the transducers near position 341, according to the Y-axis as shown. As discussed herein, this misalignment of the transducer area and a desired location on the recording medium surface is called skew (e.g., in the cross-track direction), and is undesirable to storage device performance.

FIG. 10 is a graph 610 showing transducer area protrusion clearance versus down-track distance at a magnetic head transducer area, according to various embodiments. Graph 610 of FIG. 10 was produced using modeling data. Write transducers and read transducers as discussed herein can have one or more sub-parts formed as a stack in the down-track direction. Each transducer can include one or more poles and/or pole components. The write transducer can include a writer bottom return pole 618 and a writer top return pole 616. The read transducer can include a read shield 612 and a DETCR sensor 614 (e.g., contact detection sensor 332 of FIG. 7) in addition to various other reader components (not shown), and discussed with reference to FIG. 7. With reference still to FIG. 10, and as shown from left to right (where further right along the Y-axis is further down-track), the writer bottom return pole 618 is shown as a protrusion, after which the writer top return pole 616 is shown. Next, the DETCR sensor 614 is shown, and the read shield 612 is also shown as further down-track. Graph 610 of FIG. 10 therefore shows context in a down-track dimension and various shown components and features may expand during operation. According to various embodiments, a disclosed transducer area protrusion may enlarge one or more shown features, but the view of FIG. 10 may not substantially change as shown as FIG. 10 is provided herein to show the relative protruding profiles of different features.

FIG. 11 shows a transducer area cross-track distance versus head-media clearance of an existing arrangement at 410. Shown at 410 is a transducer end surface of a transducer area. For example, the skewed CP 345 of FIG. 9 was observed according to arrangement 410. As shown, the current design shown at 410 can therefore cause a CP 418 of a transducer end surface 416 (e.g., including transducer area or feature) to be skewed off-center of a desired CP (e.g., 341 of FIG. 9) centered at the reader and writer only when the head, during operation, is caused to form a CP at a middle position (also referred to as middle diameter or "MD"), where the skew is zero and the airflow is straight heading towards the advanced air bearing (AAB) features. Therefore, the middle position could allow effective operation according to certain airflow and/or thermal effects during operation. However, in many situations, airflow and thermal shaping of the head causes an off-skew (skewed) condition, which can correspond to inner or outer test cases (inner diameter "ID," and outer diameter "OD," respectively), which can simulate transducer area and transducer end surface skew based on various conditions that lead to a greater shift in CP from a desired CP (e.g., 341) to an observed, skewed CP (e.g., 345). In an example of an existing configuration such as shown in FIG. 11, the CP can be deviated from the desired center due to asymmetry induced by the skew and orientation of the air-flow relative to the transducer area of the slider, also referred to as a skew angle effect. Other than skew angle effect, process variations (such as thermally-induced distortions, protrusions and the like) can also cause CP deviations, such as shown experimentally as the CP skew or deviation 343 taken at line B-B off chart 342 (e.g., a writer area of the transducer area) of FIG. 9. The section taken at line B-B represents a cross-track profile 344.

Turning now to the improvements and embodiments to transducer end surfaces and the like as described in the present disclosure, the disclosed solution addresses the shortcoming in the existing art in part by creating a protruding, passive feature at the transducer end surface in the cross-track direction, including the transducer area of the slider trailing edge. The embodiment shown in FIG. 12 creates a skew-independent CP peak 422 on a head of a slider to fix the CP at the center of the transducers and/or transducer area. The created, passive CP centering feature can protrude on the order of nanometers, and has the highest point at peak 422, which preferably consistently corresponds to the CP of the trailing edge transducer area. In optional embodiments, the passive CP centering feature can protrude a number of nanometers that is comparable to the fly height of the slider on which the protrusion is formed.

Figure 12:
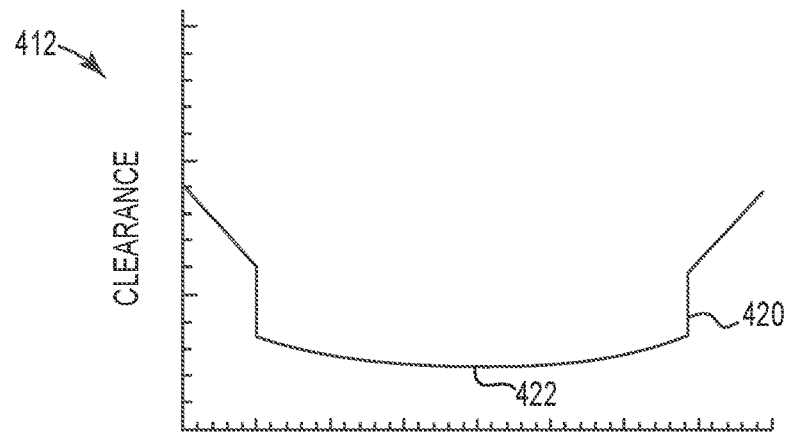
FIG. 12 shows a transducer area cross-track distance versus head-media clearance of an improved magnetic head with a passive protrusion, according to various embodiments of the present disclosure.

FIG. 12 shows a transducer area cross-track distance versus head-media clearance of an improved magnetic head with a passive protrusion at 412, according to various embodiments. Shown at 412 is a transducer end surface of a transducer area. As shown in FIG. 12, a passive, rounded protrusion at the transducer end surface 420 (e.g., transducer area or feature) has a transducer CP bulge and corresponding peak at 422 at the transducer end surface 420 of the transducer area that faces a magnetic recording medium (e.g., recording medium 128 of FIG. 2). As shown in FIG. 9, a CP peak with a conventional cross-track and clearance profile as shown in FIG. 11 leads to a skew by a skew distance (e.g., skew distance 343 of FIG. 9). With the introduction of the passive protrusion at the transducer end surface 420 with peak 422, process variations to the transducer end surface 420 area (such as thermally induced variations) may alter the shape of the slider and transducer area, and including a change to the media-facing surface of the transducer area. However, with the inclusion of the passive protrusion at the transduce end surface 420, the process variations and various aerodynamic characteristics of storage device operation may have a significantly reduced or even eliminated effect on undesirable CP skew and peak 422. Reduction of CP skew at the transducer end surface 420, including in the cross-track direction, is desirable to storage device operation to various reasons as explained further below.

To achieve best areal density capability (ADC), transducers (such as read/write transducers described above) are designed to have minimum gap close point(s) (CPs) 422 centered at the reader/writer when the respective heaters are turned on. See, e.g., a top view (as viewed from corresponding media surface) of the head transducer area 326 at FIG. 8 and passive protrusion feature embodiments at FIGS. 12-15. The protruding feature can include surface curvature formed on or at the transducer, e.g., predominantly in the cross-track direction, although any amount of down-track curvature of the protruding feature is also contemplated herein.

By providing passive height profile features at the transducer area(s) of the slider, storage devices are provided with superior precision and ADC (areal density capability). One way that precision is improved is by lowering useful slider fly height during operation. In some embodiments, storage device performance is improved because the protruding profile of the transducer area locks in or effectively "fastens" the close point (CP) at the centers of the transducers or transducer area, particularly in the cross-track direction. Head-disk spacing (head-media spacing, [HMS]) can therefore be narrowed regardless of varied head skew in the cross-track direction. However, non-zero head skew and process variations may nevertheless allow for some small amount of drift the CP peak at 422 away from the centering position while still providing the benefits of improved read/write performance. Some skew can occur, but the passive protrusion formed on the transducer area as described herein causes the CP location relative to a desired magnetic recording medium to remain stable and predictable even during head operation and thermal expansion or other affects.

Figure 13:
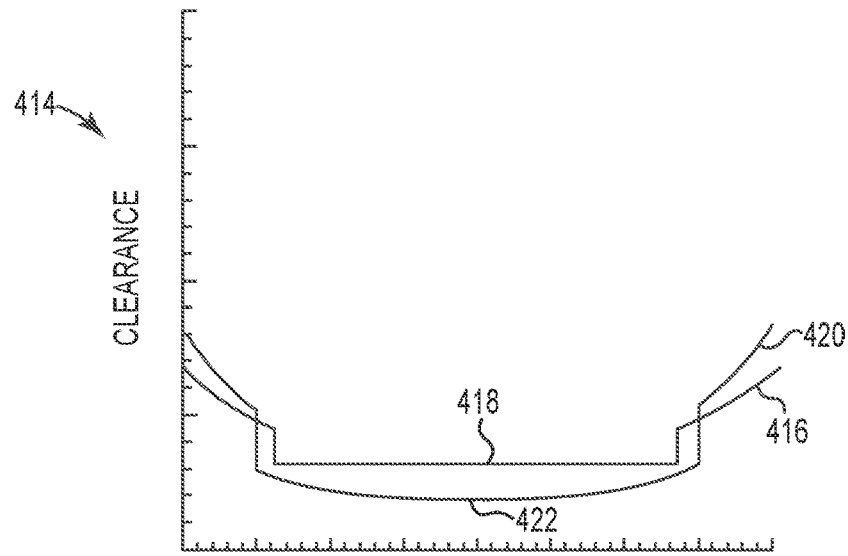
FIG. 13 shows the transducer area cross-track distance versus head-media clearance of FIGS. 11 and 12 superimposed for comparison.

In the example shown at FIG. 12, a slider having a substrate surface (e.g., a transducer area, or transducer end surface thereof) to be spaced from recording media surface within a disk drive is contemplated. In the example, at least one read/write transducer having a transducer end surface (e.g., protrusion 420) adjacent and proximate to the substrate surface. Also contemplated is a protrusion controller (e.g., a heater such as 142/144 of FIG. 2) associated with the at least one read/write transducer (not shown; e.g., a transducer 134/132 of FIG. 2). In the example, the transducer end surface (420) includes a preformed protrusion in the cross-track direction and extending generally in a direction perpendicular to the substrate surface, the protrusion is substantially centered along the transducer end surface, and the protrusion formed to passively provide a consistently-positioned CP (422) to the recording media surface when the heater is active. FIG. 13 shows the transducer area cross-track distance profile versus head-media clearance of FIGS. 11 (existing) and FIG. 12 (present disclosure) superimposed at 414 for comparison. Various embodiments described herein are shown for illustrative purposes and may not be drawn to scale.

Figure 14:
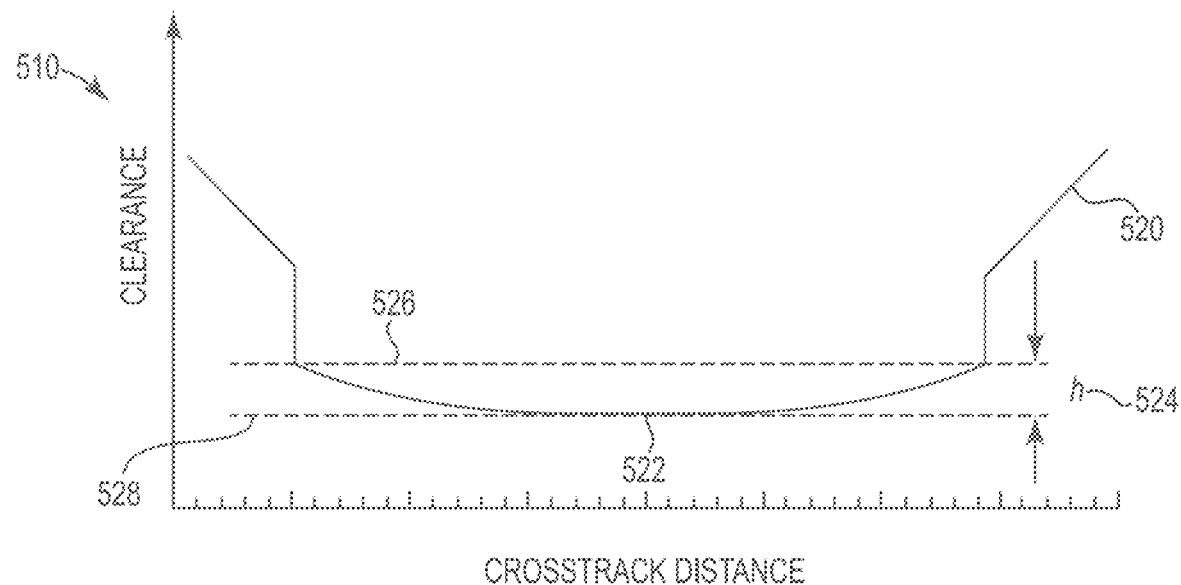
FIG. 14 is a view of a first embodiment of a magnetic head with a passive protrusion with a curved shape, according to various embodiments.

The view at FIG. 14 shown at 510 is similar to the view of FIG. 12, but adds additional technical and geometric details relating to bulge or protrusion extension or height "h" 524. Protrusion height 524 is the cross-section height profile of the same area at passive condition for the proposed design, which shows a curved profile protruding towards the disk (media) surface. As shown a baseline transducer surface level at 526 is compared with bulge peak at level 528, the difference between which is the height h 524. As shown, the protrusion peak and CP 522 can define the position of level 528 as the outermost point on the protrusion. The CP in the existing configuration of FIG. 8 is at the center of the transducer, and "h" is the protruding height. By adjusting design and processes and altering a target "h" value according to the present disclosure, the proposed design can fix the CP at the center of the transducer regardless of the skew. CP shift is therefore minimized by the creation of a protrusion profile with a protrusion height "h" towards the disk surface as shown in FIG. 14. The creation of protrusion height "h" shifts the mean value of the height of the transducer center with respect to the off-center site, which minimizes the process variation to the location variation of the CP, such as CP drift leading to skew. The proposed embodiments can minimize process variations on CP drift and/or skew. With the proper control of protrusion extension, (see, e.g., "h" 524 of FIG. 14) a drift of CP away from the center of the cross-track can be negligible.

Optimum value of "h" depends on the transducer and head-disk mechanical (HDM) designs. Based on modeling data, the CP can be optimally spaced, head to media, when the highest protruding point h is between 0.2 to 2.0 nm toward the disk surface.

Figure 15:
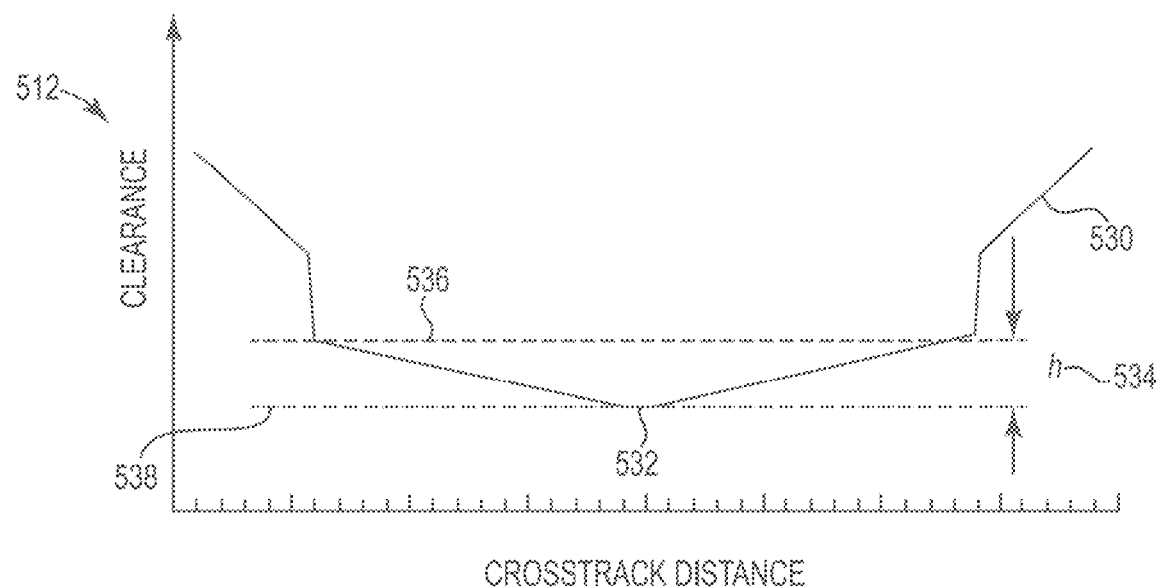
FIG. 15 is a view of a second embodiment of a magnetic head with a passive protrusion with a sloped, pent roof shape, according to various embodiments.
Figure 16A:
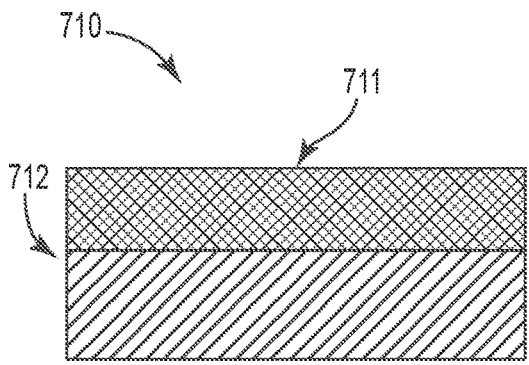
FIGS. 16A through 16H show a process for using pattern deposition to create a protruding feature, as described herein.
Figure 16E:
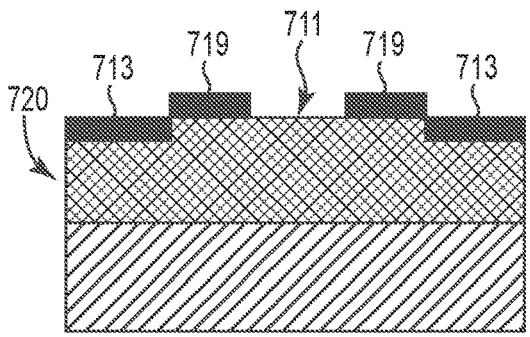
Figure 16B:
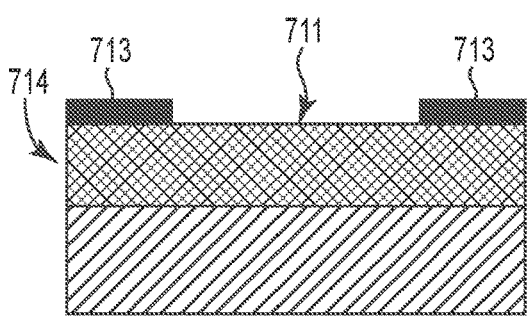
Figure 16F:
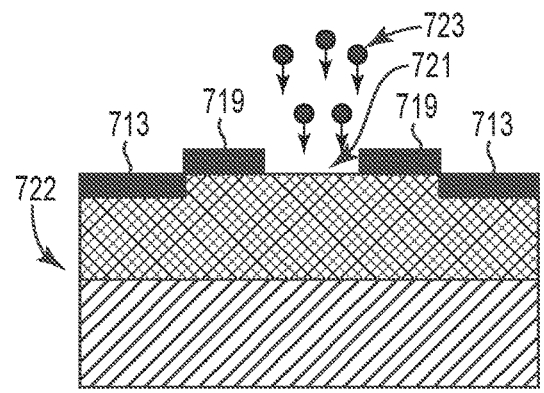
Figure 16C:
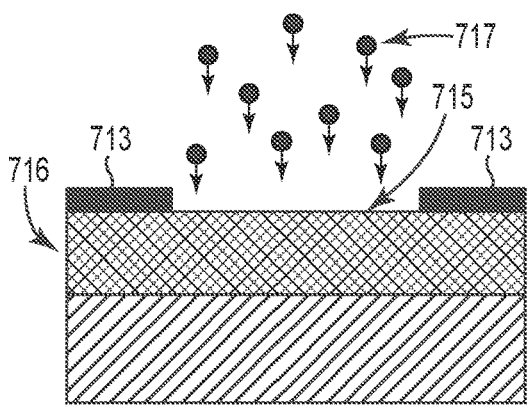
Figure 16G:
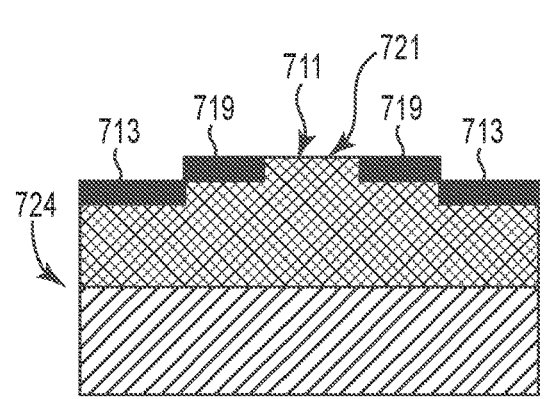
Figure 16D:
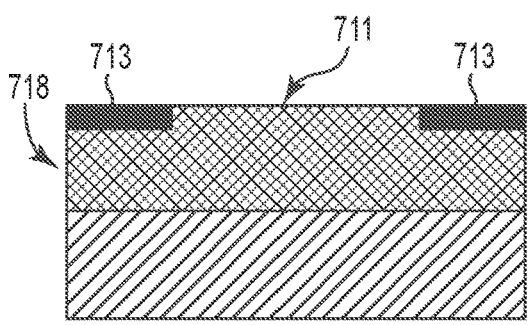
Figure 16H:
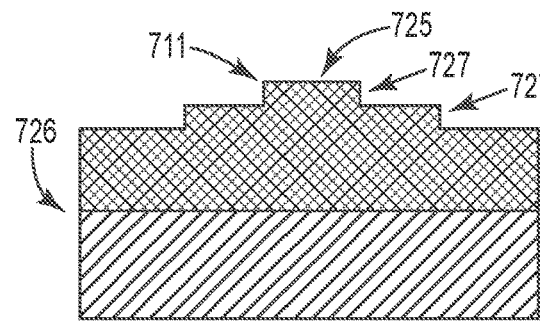
Figure 17A:
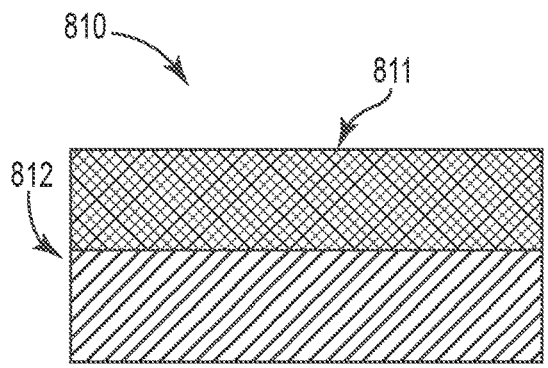
FIGS. 17A through 17H show a process for using etching to create a protruding feature, as described herein.
Figure 17E:
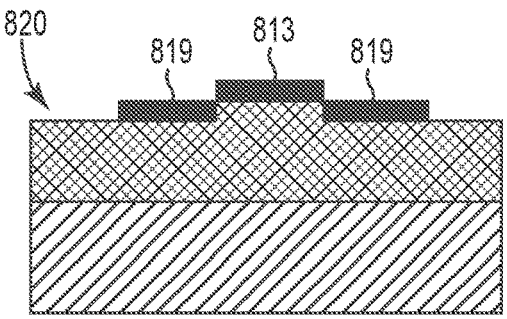
Figure 17B:
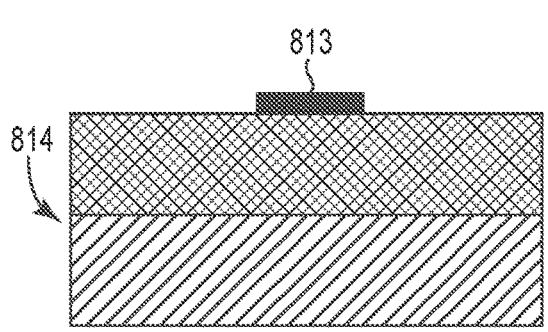
Figure 17F:
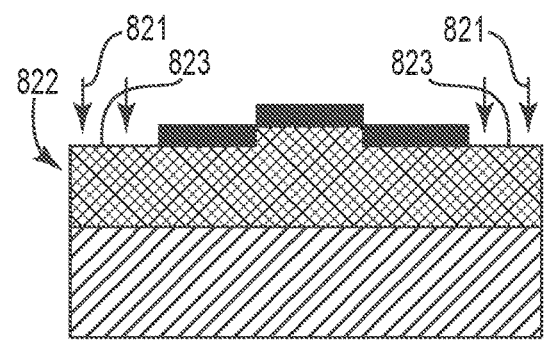
Figure 17C:
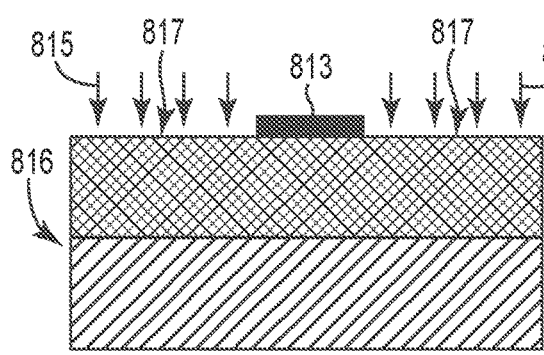
Figure 17G:
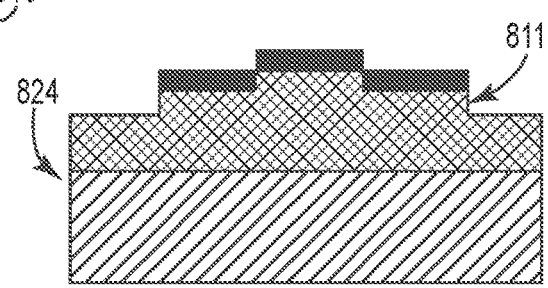
Figure 17D:
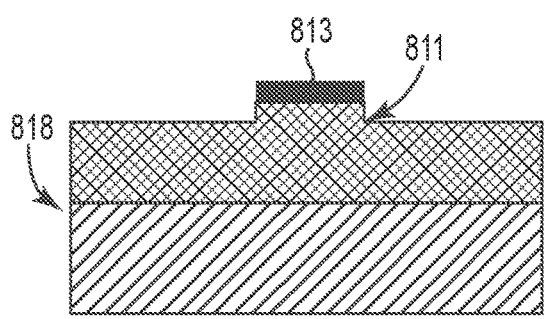
Figure 17H:
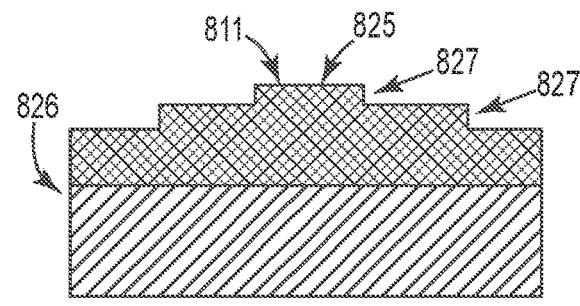

Other than the arched curvatures at the transducer area, a triangularly or pointed sloped "pent roof" feature or stepped feature, among other shapes and profiles in the cross-track direction, can be used to achieve a process-variation and more skew-independent CP location that remains centered in the cross-track direction during operation FIG. 15 shows an alternative schematic cross-section view of a configuration 512 of a protruding transducer feature 530, with a close point 532 in the form of a point or peak, and an overall shape that is sloped as a triangular "pent roof" shape. H value 534 is similarly defined by the difference between close point 532 level 538 and main body level 536. Also contemplated are various stepped shapes, such as described with reference to FIGS. 16 and 17, which can approximate smoother linear shapes in various embodiments.

Various types of manufacturing processes can be used to create the curved or sloped height profiles at the transducer area as described herein. For example, the protruding feature can be created using pattern deposition at shown in FIG. 16, by various ion or plasma etching processes as shown in FIG. 17, various combinations thereof, among any other processes. While many methods of manufacturing various embodiments herein are contemplated, FIGS. 16 and 17 depict certain example methods that are contemplated herein. The example processes described with reference to FIGS. 16 and 17 are preferably contemplated for "nano" patterning processes at a slider level or at a slider bar level. In one example, a slider bar has multiple sliders provided on a bar stripe. A wafer can contain a plurality of slider bars. Generally, the disclosed processes involve pattern deposition (FIG. 16) or pattern etching (FIG. 17). Either example process can be used to create embodiments of the protruding feature at the center of the cross-track direction, as disclosed herein.

Related to the processes of FIG. 16 or 17, it is contemplated that various operations of making a slider, including various head-specific operations, can be performed. In various embodiments, the processes of FIG. 16 or 17 can be performed following operations in a head-making process. For example, a substrate surface can be received, the substrate surface can be configured to be spaced from a recording media surface within a disk drive. The substrate surface for the slider has an associate cross-track direction and a down-track direction as discussed herein. Additionally, at least one read/write transducer can be deposited at the slider as a stack of active components, primarily provided as a stack of components in the down-track direction (see also FIG. 10). The at least one read/write transducer provided in the down-track direction preferably has an associated transducer end surface adjacent and proximate the substrate surface. A protrusion controller, e.g., as described above, can be provided and associated with the at least one deposited read/write transducer. A protrusion, as described herein, can then be formed that extends generally in a direction perpendicular to the substrate surface, the protrusion formed preferably in a cross-track direction on the transducer end surface.

As described herein, the protrusion in the cross-track direction can be caused to be formed substantially centered along the transducer end surface. The protrusion can be formed passively to provide a consistently-positioned CP relative to the recording media surface, e.g., in the cross-track direction, including when the protrusion controller is active. In various examples, the protrusion can be formed after the slider head is formed, which can include performing a trailing end cap deposition process on the substrate surface. For example, the trailing end cap deposition process can be performed during the making of the slider head, including optionally as a final step of making the slider head, and optionally prior to forming a protrusion on the transducer end surface. Optionally, the protrusion can be formed (e.g., using a plasma etching or other such process) after the trailing end cap deposition process of the slider head making process is completed.

Illustrative examples of forming the protrusion at the transducer end surface of the substrate surface of the magnetic head of the slider described above as discussed in greater detail below.

In more detail, FIG. 16 shows a visual, step-by-step process 710 for using pattern deposition to create a protruding feature, as described herein. For process 710, to create the protruding feature using pattern deposition, a transducer area 711 can be provided at operation 712. Various transducer features can be provided within the transducer area 711 before, after, or during the deposition of the protruding feature described herein. The transducer area 711 can correspond to a read or write transducer, the top of which, as shown, can be configured to face a recording medium. Next, at operation 714, masks 713 are deposited at sides of the transducer area. Next, at operation 716, a transducer exposed area 715 is subject to a deposition as shown at 717. Operation 718 shows the transducer area 711 after the partially exposed area 715 is deposited at operation 716. At operation 720, masks 719 are laid as shown over the transducer area 711. Next, at operation 722, partially exposed area(s) 721 are subject to a deposition as shown at 723. Operation 724 shows the transducer area 711 after the partially exposed areas 721 are subject to the deposition of operation 722. At operation 726, the masks 713 and 719 are removed, exposing the protruding transducer site 725.

Process 710 can be applied on an alumina cap layer (not shown) of a transducer area 711 surface. If an alumina cap layer is provided on the transducer area 711 surface, the alumina can be deposited at a rate that depends on the process and process parameters by controlling, e.g., a chamber vacuum, bias voltage, ion current, and a deposition rate can be controlled at, e.g., 0.02 A to 10 A per second. For pattern deposition, the protruding feature can be formed during the depositing of a trailing end cap layer. In other words, the protrusion can be formed during the making of the slider head itself, e.g., when using pattern deposition to form the protrusion. Pre-determined height profile patterns can be formed when depositing the trailing end cap layer.

As shown, tiered stair-like "steps" 727 are formed in the protruding transducer site 725 of the transducer area 711, which as shown can correspond in number to the number of mask operations that are performed during the process 710.

As shown, there are two steps 727 formed in the transducer area 711 due to masks 713 provided at operation 714, and masks 719 provided at operation 720. The protruding feature formed as the protruding transducer site 725 of the transducer area 711 can be increasingly close to an arc (or other) shape with more masking and corresponding deposition operations. In optional embodiments, further processing and/or shaping operations can be performed on the steps 727 of the protruding transducer site 725, such as various etching, deposition, masking, lithography, polishing, other chemical and/or mechanical shaping, or any other processing operations as known in the art.

With reference now to FIG. 17, a visual, step-by-step process 810 for using etching to create a protruding feature is shown, as described herein. For an etching process such as 810, e.g., plasma etching, sputtered alumina can be etched after a so-called "trailing end up" deposition process. Process 810, as described below, is an example that including using ion-milling etching to create a protruding transducer area protrusion, as described herein.

Process 810 can start with operation 812, in which a transducer area 811 has been previously deposited. The transducer area 811 can correspond to a read or write transducer, the top of which, as shown, can be configured to face a recording medium. At operation 814, a mask 813 can be deposited at a center of the transducer area. At operation 816, an ion-milling etching process is performed as shown at 815 to remove an exposed area 817 of the transducer area 811. At operation 818, the transducer area 811 is shown following removal of the partial exposed area 817 at operation 816. At operation 820, side masks 819 can be laid on the transducer area 811 (e.g., by a sputtering process, or the like). At operation 822, an ion-milling process can be performed as shown at 821 to remove the partially exposed area 823 not covered by side masks 819. At operation 824, the transducer area 711 is shown after the partially exposed area 823 is removed. At operation 826, the masks 813 and 819 are removed, exposing the protruding transducer site 825 of the transducer area 811 as described herein.

As shown and similar to FIG. 16, tiered stair-like "steps" 827 are formed in the protruding transducer site 825 of the transducer area 811, which as shown can correspond in number to the number of mask operations that are performed during the process 810. As shown, there are two steps 827 formed in the transducer area 811 due to mask 813 provided at operation 814, and masks 819 provided at operation 820. The resulting protruding feature formed as the protruding transducer site 825 of the transducer area 811 can be increasingly close to an arc (or other) shape with more masking and corresponding etching operations. In optional embodiments, further processing and/or shaping operations can be performed on the steps 827 of the protruding transducer site 825, such as various etching, deposition, masking, lithography, polishing, other chemical and/or mechanical shaping, or any other processing operations as known in the art.

For plasma etching processes such as process 810, etching can be applied on, e.g., sputtered alumina at the transducer area 811 after a trailing end cap deposition process of a head making process is performed (not shown). Such trailing end cap deposition processes are known in the art. For example, various contemplated end cap deposition processes are described in the article entitled: "Fabrication of magnetic recording heads and dry etching of head materials" by Hsiao, R; IBM Journal of Research and Development, Volume 43, Issue 1-2, January 1999, pp. 89-102, URL: https://doi.org/10.1147/rd.431.0089, which is hereby incorporated by reference for all purposes herein.

As contemplated herein, an alumina etching rate can vary from about 0.1 nm/min to about 10 nm/min. The alumina etching rate can depend on one or more of the etching chamber pressure, bias voltage, RF power, plasma composition, substrate temperature, etc. During etching, AIB or ScAIN masks can be used, for example. The masks should preferably have much lower etching rate than alumina. The process can be applied on the, e.g., alumina, cap layer, which can have an ion-milling etch rate of ~0.3 A/sec at ~mA ion beam current, and 100 accelerating volts. By controlling the ion-beam current, accelerating volts or the etching time, the ion-milling step height of sub-angstrom can be achieved.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

What is claimed is:

1. A slider for use in a disk drive, comprising:
 a substrate surface to be spaced from recording media surface within the disk drive;
 at least one read or write transducer having a transducer end surface adjacent and proximate to the substrate surface; and
 a protrusion controller associated with the at least one read or write transducer to cause controlled movement of the transducer end surface relative to the substrate surface of the slider when active,
 wherein the transducer end surface includes a preformed protrusion extending generally in a direction perpendicular to the substrate surface, the preformed protrusion comprising a close point that is substantially centered along the transducer end surface with end surface portions on both sides of the close point in a cross track direction that extend less distance from the substrate surface than the close point, and the preformed protrusion is formed to passively provide a consistently-positioned close-point to the recording media surface when the protrusion controller is active.

2. The slider of claim 1, wherein the preformed protrusion is curved in shape.

3. The slider of claim 1, wherein the preformed protrusion is sloped and rectilinear in shape.

4. The slider of claim 1, wherein the slider comprises at least a first and a second read or write transducer.

5. The slider of claim 4, wherein a first protrusion controller is associated with the first transducer, and a second protrusion controller is associated with the second transducer, and wherein the first protrusion controller when active causes an expansion in a first cross-track direction, and the second protrusion controller when active causes an expansion in a second cross-track direction.

6. The slider of claim 4, wherein the preformed protrusion provides the consistently-positioned close-point when any of the first and/or second transducers are active.

7. The slider of claim 1, wherein the protrusion controller is a transducer heater.

8. The slider of claim 1, wherein the preformed protrusion passively extends between about 0.2 nm and 2.0 nm toward the recording media surface from the substrate surface.

9. A storage device, comprising:
   a rotatable storage disk;
   a rotatable drive actuator arm;
   a slider including read/write head located on the rotatable drive actuator arm;
   a controller; and
   a head suspension assembly,
   wherein the slider comprises:
   a substrate surface to be spaced from a recording media surface within the storage device;
   at least one read or write transducer having a transducer end surface adjacent and proximate to the substrate surface; and
   a protrusion controller associated with the at least one read or write transducer to cause controlled movement of the transducer end surface relative to the substrate surface of the slider when active,
   wherein the transducer end surface includes a preformed protrusion extending generally a direction perpendicular to the substrate surface, the preformed protrusion comprising a close point that is substantially centered along the transducer end surface with end surface portions on both sides of a close point in the cross track direction that extend less distance from the substrate surface than the close point, and the preformed protrusion formed to passively provide a consistently-positioned close-point to the recording media surface when the protrusion controller is active.

10. The storage device of claim 9, wherein the preformed protrusion is either a) curved or b) sloped and rectilinear in shape.

11. The storage device of claim 9, wherein a shape of the preformed protrusion is formed in a cross-track direction.

12. The storage device of claim 9, wherein the slider comprises at least a first and a second read or write transducer.

13. The storage device of claim 12, wherein a first protrusion controller is associated with the first transducer, and a second protrusion controller is associated with the second transducer, and wherein the first protrusion controller when active causes an expansion in a first cross-track direction, and the second protrusion controller when active causes an expansion in a second cross-track direction.

14. The storage device of claim 9, wherein the protrusion controller is a transducer heater.

15. The storage device of claim 9, wherein the preformed protrusion passively extends between about 0.2 nm and 2.0 nm toward the recording media surface from the substrate surface.

16. A method of making a slider for use in a disk drive, comprising:
   receiving a substrate surface to be spaced from recording media surface within the disk drive;
   depositing at least one read or write transducer in a stack in a down-track direction, the at least one read or write transducer having an associated transducer end surface adjacent and proximate to the substrate surface;
   providing a protrusion controller within the stack as associated with the at least one read or write transducer to cause controlled movement of the transducer end surface relative to the substrate surface of the slider when active; and
   forming a protrusion in a cross-track direction and extending generally in a direction perpendicular to the substrate surface, wherein the protrusion includes a close point that is caused to be formed substantially centered along the transducer end surface with end surface portions on both sides of the close point in the cross track direction that extend less distance from the substrate surface than the close point, and the protrusion is formed to passively provide a consistently-positioned close-point to the recording media surface in the cross-track direction when the protrusion controller is active.

17. The method of claim 16, further comprising a trailing end cap deposition process performed on the substrate surface during a head making process, wherein the formed protrusion is formed either a) during or b) after the trailing end cap deposition process.

18. The method of claim 17, wherein the formed protrusion is formed using a pattern deposition process, and wherein the protrusion is formed a) during the trailing end cap deposition process.

19. The method of claim 18, wherein the formed protrusion is formed using an etching process, and wherein the formed protrusion is formed b) after the trailing end cap deposition process.

* * * * *